United States Patent
Kiyohiro et al.

(10) Patent No.: US 12,237,716 B2
(45) Date of Patent: Feb. 25, 2025

(54) POWER SUPPLY DEVICE WITH GENERATOR AND BATTERY

(71) Applicant: HONDA MOTOR CO., LTD., Tokyo (JP)

(72) Inventors: Yukihiko Kiyohiro, Wako (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 18/120,223

(22) Filed: Mar. 10, 2023

(65) Prior Publication Data
US 2023/0216336 A1 Jul. 6, 2023

Related U.S. Application Data

(63) Continuation of application No. PCT/JP2020/035127, filed on Sep. 16, 2020.

(51) Int. Cl.
*H02J 9/06* (2006.01)
*H02J 7/14* (2006.01)
(Continued)

(52) U.S. Cl.
CPC ............... *H02J 9/061* (2013.01); *H02J 7/14* (2013.01); *H02J 7/34* (2013.01); *H01M 50/204* (2021.01)

(58) Field of Classification Search
CPC ........ H02J 9/04–08; H02J 7/14; H02J 7/1415; H02J 7/34; H02J 3/32; H02J 2300/10; B60L 55/00; B60L 1/006
See application file for complete search history.

(56) References Cited

U.S. PATENT DOCUMENTS 9,896,087 B2   2/2018  Fukui et al.
11,296,510 B1* 4/2022  Culbertson, II .......... H02J 9/08
(Continued)

FOREIGN PATENT DOCUMENTS

JP   2012-224187 A   11/2012
JP   2015-145223 A   8/2015
(Continued)

OTHER PUBLICATIONS

English machine translation of KR20180127771A published Nov. 30, 2018. (Year: 2018).*
(Continued)

*Primary Examiner* — Rexford N Barnie
*Assistant Examiner* — David A Shiao
(74) *Attorney, Agent, or Firm* — WHDA, LLP

(57) ABSTRACT

The present invention provides a power supply device that supplies power to an external load, comprising: a generator configured to generate electric power by power of an engine; a housing container configured to house a battery; a state determination unit configured to determine a state of the power supply device; and a control unit configured to control charging of the battery housed in the housing container and power supply to the external load, wherein the generator includes a tank that stores fuel for the engine, and in a case where the state determination unit determines that a remaining amount of fuel in the tank is less than a threshold, the control unit automatically transitions to a control mode in which power supply to the external load is controlled by the power from the generator and the power from the battery.

7 Claims, 3 Drawing Sheets

(51) Int. Cl.
*H02J 7/34* (2006.01)
*H01M 50/204* (2021.01)

(56) References Cited

U.S. PATENT DOCUMENTS

| | | | | |
|---|---|---|---|---|
| 2002/0051368 A1* | 5/2002 | Ulinski | ............... | H02J 7/34 |
| | | | | 363/1 |
| 2007/0273213 A1* | 11/2007 | Wang | ............... | H02J 3/38 |
| | | | | 307/66 |
| 2010/0181837 A1* | 7/2010 | Seeker | ............... | H02J 1/102 |
| | | | | 307/72 |
| 2011/0090726 A1* | 4/2011 | Brotto | ............... | H02J 7/007182 |
| | | | | 363/131 |
| 2013/0099576 A1* | 4/2013 | Chuah | ............... | H02J 7/04 |
| | | | | 320/132 |
| 2016/0359328 A1* | 12/2016 | Hunt | ............... | H02J 9/062 |
| 2017/0008511 A1* | 1/2017 | Fukui | ............... | B60L 53/14 |
| 2017/0088114 A1* | 3/2017 | Nawata | ............... | B60L 1/006 |
| 2017/0101023 A1* | 4/2017 | Nawata | ............... | B60W 10/26 |
| 2020/0251910 A1* | 8/2020 | Moorman | ............... | H02J 7/34 |
| 2020/0373769 A1 | 11/2020 | Takada et al. | | |
| 2021/0075222 A1* | 3/2021 | Wilson | ............... | H02J 7/00712 |

FOREIGN PATENT DOCUMENTS

| | | | |
|---|---|---|---|
| JP | 2016-168902 A | | 9/2016 |
| JP | 2016-184995 A | | 10/2016 |
| JP | 2016-532599 A | | 10/2016 |
| JP | 2018-86970 A | | 6/2018 |
| KR | 20180127771 A | * | 11/2018 |
| WO | 2015/038461 A1 | | 3/2015 |
| WO | 2019/159417 A1 | | 8/2019 |

OTHER PUBLICATIONS

International Search Report dated Oct. 20, 2020, issued in counterpart International Application No. PCT/JP2020/035127, with English Translation. (6 pages).
International Preliminary Report on Patentability (Form PCT/IPEA/409) of International Application No. PCT/JP2020/035127 dated Mar. 16, 2021. (11 pages).

* cited by examiner

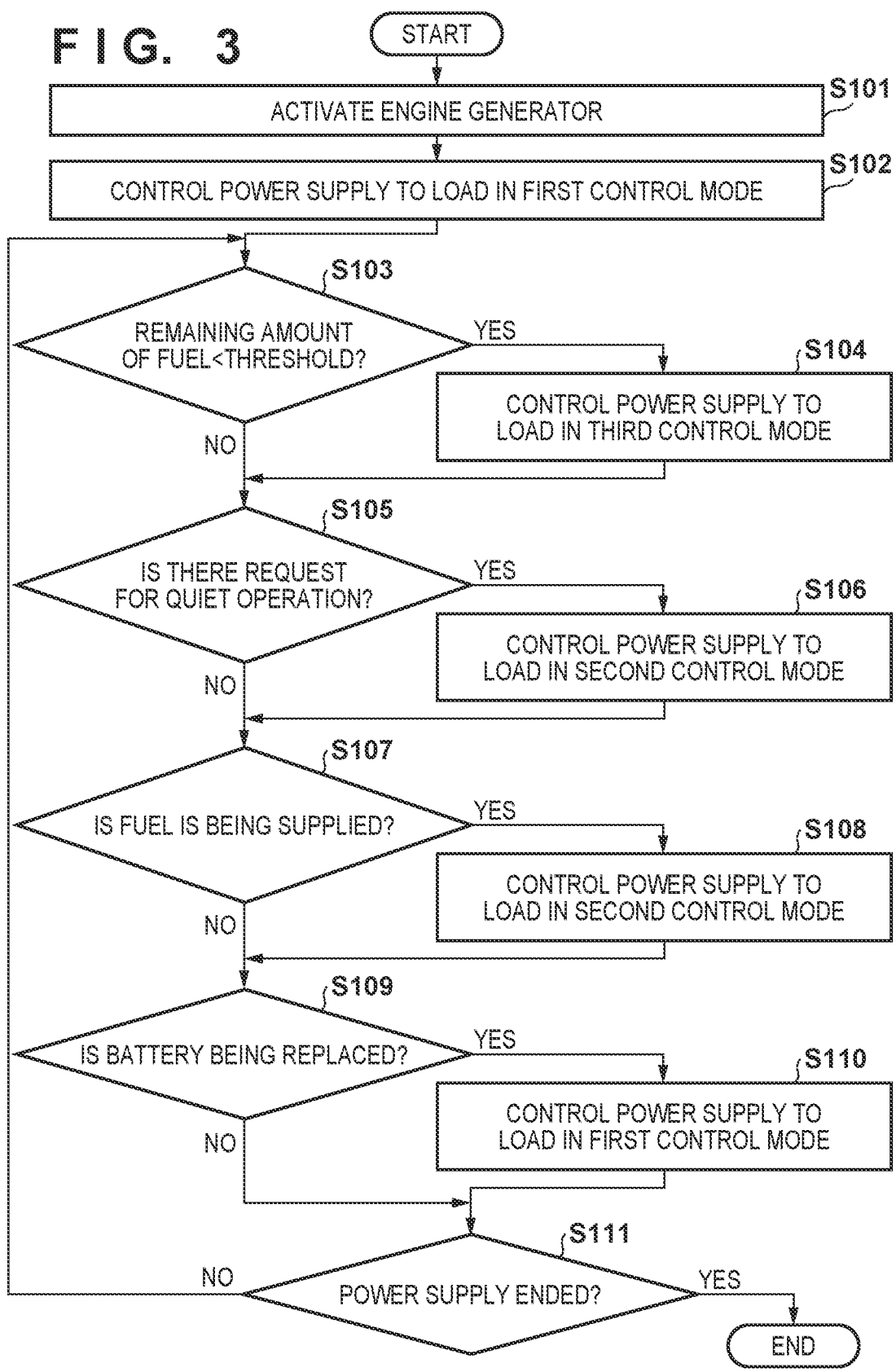

POWER SUPPLY DEVICE WITH GENERATOR AND BATTERY

CROSS-REFERENCE TO RELATED APPLICATION(S)

This application is a continuation of International Patent Application No. PCT/JP2020/035127 filed on Sep. 16, 2020, the entire disclosures of which is incorporated herein by reference.

BACKGROUND OF THE INVENTION

Field of the Invention

The present invention relates to a power supply device that supplies power to an external load.

Description of the Related Art

Japanese Patent Laid-Open No. 2012-224187 discloses a hybrid generator capable of outputting power from a battery and power from an engine generator driven by an engine. In the hybrid generator described in Japanese Patent Laid-Open No. 2012-224187, the distribution of the output from the generator and the output from the battery is determined in consideration of the presence or absence of the load and the remaining amount of the battery, and the output instruction is given to the engine control unit and the battery control unit according to the distribution.

In the hybrid generator, even when a remaining amount of the fuel for the engine in the engine generator is small, it is desirable to stably supply the power to the external load for as long as possible.

SUMMARY OF THE INVENTION

The present invention provides, for example, an advantageous technique for stably supplying power to an external load in a hybrid generator.

According to the present invention, there is provided a stationary power supply device that supplies power to an external load, comprising: a generator configured to generate electric power by power of an engine; a housing container configured to house a battery; a state determination unit configured to determine a state of the power supply device; and a control unit configured to control charging of the battery housed in the housing container and power supply to the external load, by power from the generator, wherein the generator includes a tank that stores fuel for the engine, and in a case where the state determination unit determines that a remaining amount of fuel in the tank is less than a threshold, the control unit automatically transitions to a control mode in which the power from the battery housed in the housing container is used in an auxiliary manner and power supply to the external load is controlled by the power from the generator and the power from the battery.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a flow chart showing a method of controlling power supply to an external load by the power supply device.

DESCRIPTION OF THE EMBODIMENTS

Figure 1:
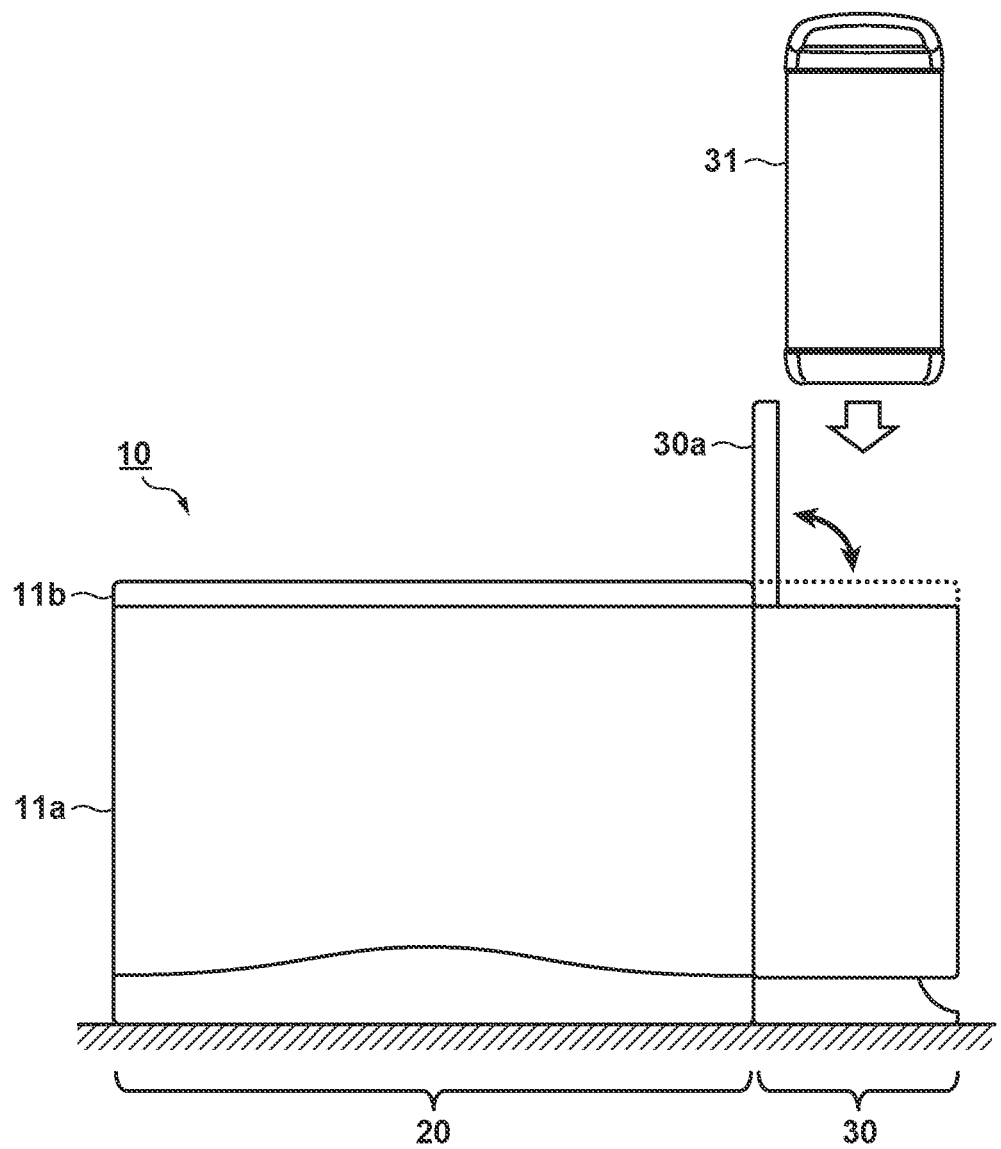
FIG. 1 is an external view of a power supply device.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 2:
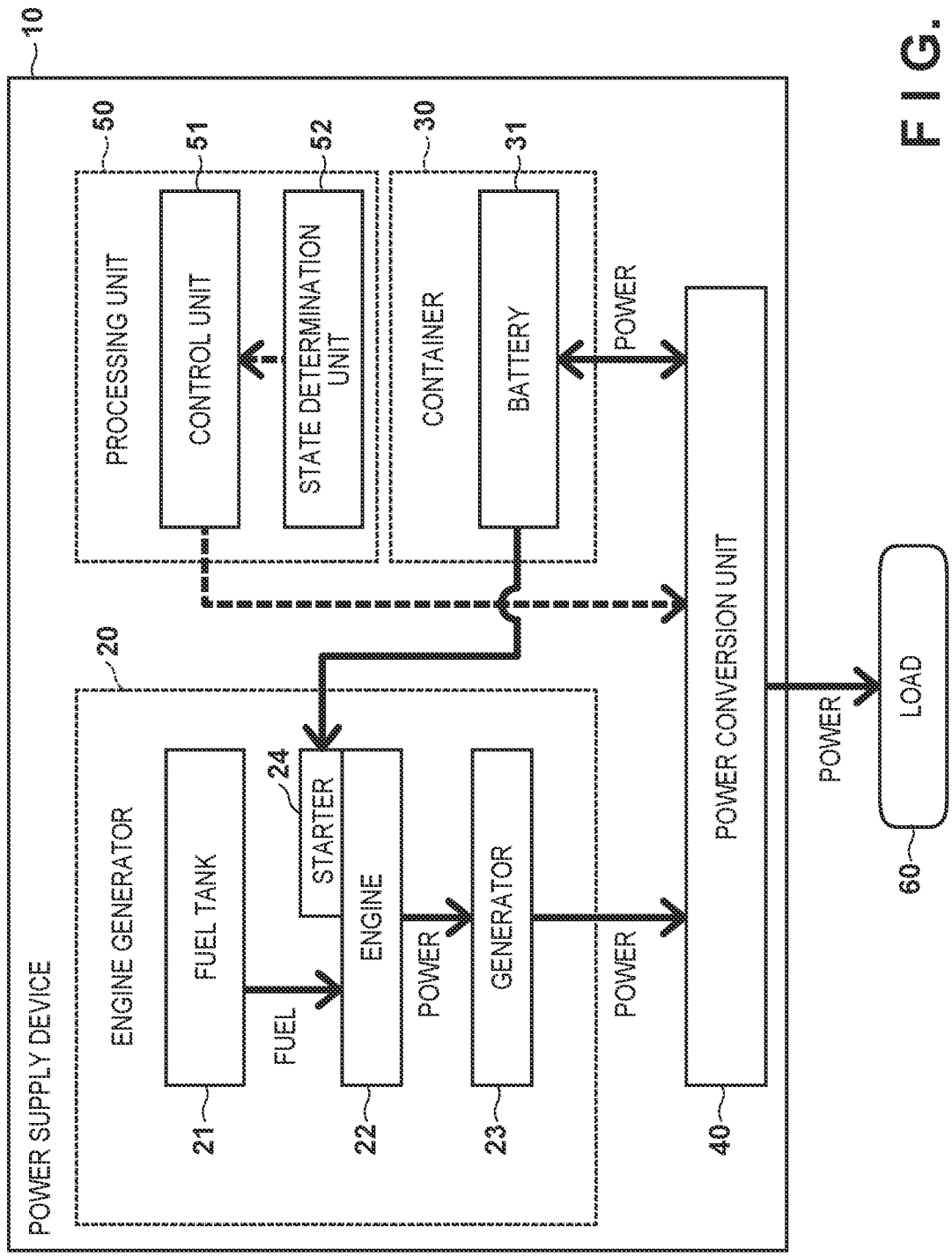
FIG. 2 is a block configuration diagram of the power supply device.

A power supply device 10 (power supply system) according to an embodiment of the present invention will be described. FIG. 1 is an external view of the power supply device 10 according to the present embodiment, and FIG. 2 is a block configuration diagram of the power supply device 10 according to the present embodiment. The power supply device 10 of the present embodiment is a stationary hybrid generator including an engine generator 20 capable of generating power by power of an engine and a housing container 30 capable of housing a battery 31, and is configured to be able to selectively supply power from the engine generator 20 and power from the batter 31 to an external load 60. The engine generator 20 is disposed inside a housing portion 11a, having an openable and closable lid 11b, and the housing container 30 is attached to the housing portion 11a. The housing container 30 has an openable and closable lid 30a in an upper portion, and is configured such that the battery 31 can be inserted into and removed from (detachable from) the housing container 30 in a state where the lid 30a is open. Although only one battery 31 is illustrated in the example shown in FIG. 1, the housing container 30 is preferably configured to be able to accommodate a plurality of batteries 31. Furthermore, the battery 31 may be, for example, a portable battery mounted on an electric vehicle (electric two-wheeled vehicles, electric four-wheeled vehicles, and the like).

As shown in FIG. 2, the engine generator 20 may include, for example, a fuel tank 21, an engine 22, and a generator 23. The fuel tank 21 is a tank that stores fuel (gasoline or the like) for the engine 22, and the fuel can be supplied to the fuel tank 21 in a state where the lid 11b of the housing portion 11a is open. The engine 22 is an ignition-type air-cooled engine using, for example, gasoline or the like as fuel and has a piston reciprocating in a cylinder, and a crankshaft rotating in synchronization with the piston. Power of the engine 22 is output (transmitted) to the generator 23 via the crankshaft. The crankshaft is provided with a starter 24 (starter motor), and the engine 22 can be started by driving the starter 24 with power from the battery 31. The generator 23 is, for example, a multipolar alternator that is driven by the power of the engine 22 to generate AC power, and includes a rotor that is connected to the crankshaft of the engine 22 and rotates integrally with the crankshaft, and a stator disposed concentrically with the rotor while facing a peripheral surface of the rotor. The rotor is provided with a permanent magnet, and the stator may be provided with coils arranged at phase angles, fir example, every 120 degrees.

The power generated by the generator 23 is supplied to the power conversion unit 40. The power conversion unit 40 is a unit that converts the power from the generator 23 and the power from the battery 31 into power to be supplied to the external load 60. In the case of the present embodiment, the power conversion unit 40 is disposed inside the housing portion 11a, and can be configured to be able to selectively supply the power from the generator 23, the power from the battery 31, or both of these powers (combined power) to the external load 60. For example, the power conversion unit 40 rectifies the power from the generator 23 to step down the power to a predetermined voltage, further converts the power to an AC of a predetermined frequency (for example, a commercial frequency), performs a filtering process, and supplies the AC to the external load 60. In addition, the power conversion unit 40 can supply the power from the battery 31 to the external load 60 by combining (summing) the power with the power from the generator 23 after passing through the isolated DC-DC converter. As a specific configuration of the power conversion unit 40, the configuration of the power conversion unit described in Japanese Patent Laid-Open No. 2012-224187 can be applied (adopted).

In addition, the power supply device 10 may include a processing unit 50. The processing unit 50 is, for example, an electronic control unit (ECU), and includes a processor represented by a central processing unit (CPU), a storage device such as a semiconductor memory, an interface with an external device, and the like. The storage device stores a program to be executed by the processor, data to be used for processing by the processor, and the like, and the processing unit 50 can read and execute the program. The processing unit 50 of the present embodiment is disposed inside the housing portion 11a and can include, for example, a control unit 51 and a state determination unit 52.

The control unit 51 controls charging of the battery 31 housed in the housing container 30 by the power from the generator 23, and controls power supply to the external load 60 by selectively using the power from the generator 23 and the power from the battery 31. In the case of the present embodiment, the control unit 51 has a first control mode, a second control mode, and a third control mode as control modes for controlling power supply to the external load 60, and switches the control mode according to the state of the power supply device 10 determined by the state determination unit 52. The first control mode is a control mode for controlling power supply to the external load 60 by the power from the generator 23 without using the power from the battery 31 housed in the housing container 30 (that is, by using only the engine generator 20). The second control mode is a control mode for controlling power supply to the external load 60 by the power from the battery 31 housed in the housing container 30 without using the power from the generator 23 (that is, by using only the battery 31). The third control mode is a control mode for controlling power supply to the external load 60 by both the power from the generator 23 and the power from the battery 31 using the power from the battery 31 housed in the housing container 30 in an auxiliary manner (that is, by using both the generator 23 and the battery 31).

The state determination unit 52 determines the state of the power supply device 10 on the basis of detection results by various sensors provided in the power supply device 10. For example, on the basis of a detection result of a sensor configured to detect the remaining amount (storage amount) of the fuel in the fuel tank 21 (in the tank), the state determination unit 52 can determine that the remaining amount is less than the threshold. In addition, the state determination unit 52 can determine that fuel is being supplied into the fuel tank 21 (and/or the refueling of the fuel into the fuel tank 21 is started) on the basis of a detection result of a sensor configured to detect opening and closing of the lid 11b of the housing portion 11a anther a detection result of the sensor configured to detect a remaining amount of the fuel in the fuel tank 21. The state determination unit 52 can also determine that the battery 31 is being replaced in the housing container 30 on the basis of a detection result of a sensor configured to detect opening and closing of the lid 30a of the housing container 30 anther a detection result of a sensor configured to detect the presence or absence of the battery 31 in the housing container 30. Furthermore, the state determination unit 52 can determine whether a quiet operation has been requested. For example, the state determination unit 52 can determine whether or not the quiet operation is requested on the basis of whether or not the current time is within a predetermined time period for which quietness is requested. The predetermined time period for which quietness is requested may be, for example, nighttime. In this case, "nighttime" may be defined as a period from sunset to sunrise in the next morning, or may be defined as a preset time range (for example, a period from 21:00 to 7:00 in the next morning). The predetermined time period is not limited to the nighttime, and may be a time range arbitrarily set by the user. In addition, in a case where a button (switch) for requesting a quiet operation is provided in the power supply device 10, the state determination unit 52 can determine whether or not the quiet operation has been requested on the basis of whether or not the button leas been pressed.

Next, a method of controlling power supply to the external load 60 by the power supply device 10 according to the present embodiment will be described. FIG. 3 is a flow chart showing a method of controlling power supply to the external load 60 by the power supply device 10 according to the present embodiment. The flowchart shown in FIG. 3 may be started when a start instruction of the power supply device 10 is given by the user. The start instruction can be given by, for example, pressing of a power button provided in the power supply device 10 or an activation start signal transmitted from an information terminal of the user via wireless communication or the like. Furthermore, each step of the flowchart can be carried out by the processing unit 50 (control unit 51, state determination unit 52).

In step S101, the processing unit 50 (control unit 51) activates the engine generator 20. For example, the control unit 51 drives the starter 24 with the power from the battery 31 to activate the engine 22, thereby activating the engine generator 20 (that is, the generator 23 is caused to start power generation). Then, in step S102, the control unit 51 controls power supply to the external load 60 in the first control mode (that is, by the electric power from the generator 23). Furthermore, at this time, the control unit 51 may control charging of the battery 31 housed in the housing container 30 by the power from the generator 23.

In step S103, the processing unit 50 (state determination unit 52) determines whether or not the remaining amount of the fuel in the fuel tank 21 is less than a threshold. For example, on the basis of a detection result of a sensor configured to detect the remaining amount of the fuel in the fuel tank 21, the state determination unit 52 can determine whether or not the remaining amount is less than the threshold. The "threshold" can be arbitrarily set, and as an example, can be set to the remaining amount of the fuel with which the operable time of the engine generator 20 (engine 22) is about several tens of minutes to several hours (for example, 30 minutes to 2 hours) when power is supplied to the external load 60 using only the generator 23. When it is determined that the remaining amount of the fuel in the fuel tank 21 is less than the threshold, the process proceeds to step S104, and when it is determined that the remaining amount is no less than the threshold, the process proceeds to step S105.

In step S104, the processing unit 50 (control unit 51) transitions to the third control mode and starts the control of the power supply to the external load 60 by the power from the generator 23 and the power from the battery 31. In the third control mode, the control unit 51 controls the power supply to the external load 60 using the power from the battery 31 in an auxiliary manner so that the operable time of the engine 22 by the fuel stored in the fuel tank 21 is extended from that in the first control mode. As described above, by controlling the power supply to the external load 60 in the third control mode, it is possible to extend the operable time of the engine generator 20 (engine 22) by the fuel stored in the fuel tank 21 as compared with the case of using the first control mode. Therefore, even when the user cannot refill the fuel tank 21 early, the power supply device 10 can be operated without being stopped for as long a period as possible, and the power supply to the external load 60 can be stably (continuously) performed. That is, user convenience can be improved.

In step S105, the processing unit 50 (state determination unit 52) determines Whether a quiet operation has been requested. For example, the state determination unit 52 determines that the quiet operation has been requested in a case where the current time is within a predetermined time period for which quietness is requested (for example, nighttime). As an example, the state determination unit 52 includes a clock, and can determine that the quiet operation has been requested when the current time is in a preset time range (for example, a period from 21:00 to 7:00 in the next morning). In addition, also in a case where a button (switch) provided in the power supply device 10 for requesting a quiet operation has been pressed by the user, the state determination unit 52 can determine that the quiet operation has been requested. When it is determined that the quiet operation has been requested, the process proceeds to step S106, and when it is determined that the quiet operation has not been requested, the process proceeds to step S107.

In step S106, the processing unit 50 (control unit 51) transitions to the second control mode and starts the control of the power supply to the external load 60 by the power from the battery 31. In this case, the second control mode may be interpreted to be a control mode (quiet mode, night mode) for forcibly transitioning in response to a request for the quiet operation by the user. In step S106, the control unit 51 may stop the engine generator 20 (engine 22) with the transition to the second control mode. Upon transition from the second control mode to the first control mode or the third control mode, the engine generator 20 (engine 22) may be activated again. In general, in the engine generator 20, noise is generated by the operation of the engine 22, and thus, it is desirable to reduce the noise at nighttime, for example. As in the present embodiment, when there has been a request for a quiet operation by the user, the noise can be reduced by controlling the power supply to the external load 60 using only the battery 31.

In step S107, the processing unit 50 (state determination unit 52) determines whether or not the fuel is being supplied into the fuel tank 21. For example, the state determination unit 52 can determine whether fuel is being supplied to the fuel tank 21 on the basis of a detection result of a remaining amount sensor configured to detect a remaining amount of fuel in the fuel tank 21. Specifically, the state determination unit 52 can determine that fuel is being supplied when the remaining amount sensor detects that the remaining amount of fuel is increasing. In addition, the state determination unit 52 may determine whether fuel is being supplied on the basis of a detection result of an opening/closing sensor configured to detect opening and closing of the lid 11*b* of the housing portion 11*a* opened and closed when fuel is supplied into the fuel tank 21. Specifically, the state determination unit 52 can determine that the fuel supply is started when the opening/closing sensor detects that the lid 11*b* is opened, and can determine that the fuel supply is ended when the opening/closing sensor detects that the lid 11*b* is closed. That is, the state determination unit 52 can determine that the fuel is being supplied in a period in which the opening/closing sensor detects the open state of the lid 11*b*. When it is determined that the fuel is being supplied, the process proceeds to step S108, and when it is determined that the fuel is not being supplied, the process proceeds to step S107.

In step S108, the processing unit 50 (control unit 51) transitions to the second control mode and starts the control of the power supply to the external load 60 by the power from the battery 31. At this time, the control unit 51 may stop the engine generator 20 (engine 22) with the transition to the second control mode. Upon transition from the second control mode to the first control mode or the third control mode, the engine generator 20 (engine 22) may be activated again. In general, in the engine generator 20, in order to improve safety, it is desirable to reduce the power output during the supply of the fuel to the fuel tank 21, and it is more desirable to stop the engine 22. The safely of the power supply device 10 can be improved by automatically transitioning to the second control mode or automatically stopping the engine 22 during the supply of the fuel as in the present embodiment.

In step S109, the processing unit 50 (state determination unit 52) determines whether the battery 31 in the housing container 30 is being replaced. For example, the state determination unit 52 can determine whether or not the battery 31 is being replaced on the basis of a detection result of a battery presence/absence sensor configured to detect the presence or absence of the battery 31 in the housing container 30. Specifically, when the battery presence/absence sensor detects a state in which the battery 31 has been removed from the housing container 30 and the battery 31 is absent in the housing container 30, the state determination unit 52 can determine that the batter 31 is being replaced. In addition, the state determination unit 52 may determine whether or not the battery 31 is being replaced on the basis of a detection result of an opening/closing sensor configured to detect opening/closing of the lid 30*a* opened/closed when the battery 31 is replaced. Specifically, the state determination unit 52 can determine that the battery 31 is being replaced in a period in which the opening/closing sensor detects the open state of the lid 30*a*. When it is determined that the battery 31 is being replaced, the process proceeds to step S110, and when it is determined that the battery 31 is not being replaced, the process proceeds to step S111.

In step S110, the processing unit 50 (control unit 51) transitions to the first control mode and starts control of power supply to the external load 60 by the power from the engine generator 20 (generator 23). Note that this step S110 can be carried out during the operation in the second control mode or the third control mode in steps S104, S106, and S108 described above. In this manner, by automatically transitioning to the first control mode during replacement of the battery 31, user convenience can be improved.

In step S111, the processing unit 50 (control unit 51) determines whether or not to end the power supply to the external load 60. For example, the control unit 51 can determine that the power supply to the external load 60 is to be ended when a stop instruction of the power supply device 10 is given by the user. The stop instruction can be given by, for example, pressing of a power button provided in the power supply device 10 or a stop signal transmitted from an information terminal of the user via wireless communication or the like. When it is determined that the power supply to the external load 60 is to be stopped, the flow chart is finished, and when it is determined that the power supply to the external load 60 is not to be stopped, the process returns to step S103.

As described above, the power supply device 10 of the present embodiment switches the control mode of the power supply to the external load 60 according to the state of the power supply device 10 determined by the state determination unit 52. As a result, the convenience and safety of the user in the power supply device 10 can be improved.

Other Embodiments

The power supply device 10 may be configured to be able to transmit and receive information to and from an information terminal of a user via a network or the like. In this case, the processing unit 50 can be provided with a communication unit for transmitting and receiving information to and from the information terminal of the user. As an example, the control unit 51 may notify the information terminal of the user of the control mode (first control mode, second control mode, or third control mode) currently being executed in the power supply device 10 via the communication unit.

Summary of Embodiments

1. An power supply device of the above-described is a power supply device (e.g. 10) that supplies power to an external load (e.g. 60), and comprises:
    a generator (e.g. 20) capable of generating electric power by power of an engine (e.g. 22);
    a housing container (e.g. 30) capable of housing a battery (e.g. 31);
    state determination means (e.g. 52) for determining a state of the power supply device; and
    control means (e.g. 51) for controlling charging of the battery housed in the housing container and power supply to the external load, by power from the generator, wherein
    the generator includes a tank (e.g. 21) that stores fuel for the engine, and
    in a case where the state determination means determines that a remaining amount of fuel in the tank is less than a threshold, the control means uses the power from the battery housed in the housing container in an auxiliary manner and controls power supply to the external load by the power from the generator and the power from the battery.

According to this embodiment, it is possible to extend the operable time of the engine as compared with the case of using only the generator. Therefore, even when the user cannot refill the tank early, the power supply device can be operated without being stopped for as long a period as possible, and the power supply to the external load can be stably performed, so that the user convenience can be improved.

2. In the above-described embodiment,
    in a case where the state determination means determines that the remaining amount is less than the threshold, the control means controls the power supply to the external load using the power from the battery in an auxiliary manner so that an operable time of the engine by the fuel stored in the tank is extended as compared with a case where only the power from the generator is used.

According to this embodiment, even in a case where the user cannot refill the tank early, the power supply to the external load can be stably performed, so that the user convenience can be improved.

3. In the above-described embodiment,
    in a case where the state determination means determines that the fuel is being supplied into the tank, the control means controls the power supply to the external load by the power from the battery without using the power from the generator during the fuel supply.

According to this embodiment, it is possible to improve the safety of the power supply device by automatically transitioning to the control mode of controlling the power supply to the external load by the power from the battery without using the power from the generator during the refueling.

4. In the above-described embodiment,
    in a case where the state determination means determines that the battery is being replaced in the housing container, the control means controls the power supply to the external load by the power from the generator without using the power from the battery during the replacement of the battery.

According to this embodiment, it is possible to improve the user convenience by automatically transitioning to the control mode of controlling the power supply to the external load by the power from the generator without using the power from the battery during replacement of the battery.

5. In the above-described embodiment,
    in a case where the state determination means determines that quiet operation is requested, the control means controls the power supply to the external load by the power from the battery without using the power from the generator.

According to the present embodiment, it is possible to reduce noise generated by the operation of the engine when a quiet operation is requested by the user, for example at nighttime.

6. In the above-described embodiment,
    the state determination means determines that the quiet operation is requested in a case where current time is within a predetermined time period for which quietness is requested and/or when a button provided for requesting the quiet operation is pressed by a user.

According to this embodiment, it is possible to automatically transition to the control mode of controlling the power supply to the external load by the power from the battery in response to the request for the quiet operation by the user, and to reduce the noise generated by the operation of the engine.

7. In the above-described embodiment,
    the housing container is configured to be able to house a plurality of batteries.

According to the embodiment, in the power supply device, the plurality of batteries can be charged by the power from the generator, and the power supply to the external load can be more efficiently controlled.

The present invention is not limited to the above embodiments and various changes and modifications can be made within the spirit and scope of the present invention. Therefore, to apprise the public of the scope of the present invention, the following claims are made.

What is claimed is:

1. A stationary power supply device that supplies power to an external load, comprising:
   a generator configured to generate electric power by power of an engine;
   a housing container configured to house a battery;
   a controller configured to determine a state of the power supply device, and
   control charging of the battery housed in the housing container and power supply to the external load, by power from the generator,
   wherein the generator includes a tank that stores fuel for the engine,
   wherein the controller has a first mode of controlling power supply to the external load by power from the generator without using power from the battery, and a second mode of controlling power supply to the external load by both power from the generator and power from the battery such that power from the battery is used as an auxiliary power, and
   wherein the controller is configured to, in a case of determining that a remaining amount of fuel in the tank is less than a threshold during controlling power supply to the external load by the first mode, automatically transition to the second mode and control power supply to the external load by the second mode.

2. The power supply device according to claim 1, wherein the controller is configured to control power supply to the external load by the second mode so that an operable time of the engine by the fuel stored in the tank is extended as compared with a case of controlling power supply to the external load by the first mode.

3. The power supply device according to claim 1, wherein the controller further has a third mode of controlling power supply to the external load by power from the battery without using power from the generator, and
   the controller is configured to, in a case of determining that the fuel is being supplied into the tank during controlling power supply to the external load by the first mode or the second mode, automatically transition to the third mode and control power supply to the external load by the third mode during the fuel is supplied into the tank.

4. The power supply device according to claim 1, wherein the controller is configured to, in a case of determining that the battery is being replaced in the housing container, automatically transition to the first mode and control power supply to the external load by the first mode during the replacement of the battery.

5. The power supply device according to claim 1, wherein the controller further has a third mode of controlling power supply to the external load by power from the battery without using power from the generator, and
   the controller is configured to, in a case of determining that quiet operation is requested during controlling power supply to the external load by the first mode or the second mode, automatically transition to the third mode and control power supply to the external load by the third mode.

6. The power supply device according to claim 5, wherein the controller is configured to determine that the quiet operation is requested in a case where current time is within a predetermined time period for which quietness is requested and/or when a button provided for requesting the quiet operation is pressed by a user.

7. The power supply device according to claim 1, wherein the housing container is configured to be able to house a plurality of batteries.

* * * * *